(12) United States Patent
Shin et al.

(10) Patent No.: US 8,913,093 B2
(45) Date of Patent: Dec. 16, 2014

(54) LIQUID CRYSTAL DISPLAY DEVICE

(71) Applicant: LG Display Co., Ltd., Seoul (KR)

(72) Inventors: JongSuk Shin, Yongin-si (KR);
JongHyuck Lee, Gumi-si (KR);
HoonSub Shin, Gyeongsangbuk-do (KR); HeeSung Woo, Dalseo-gu (KR);
DaeHyun Kim, Yeongdeungpo-gu (KR);
JiYun Jang, Gyeongsangbuk-do (KR);
HyoSik Song, Songpa-gu (KR);
Junsung Kong, Busanjin-gu (KR);
Ho-Jae Kim, Gyeongsan-si (KR)

(73) Assignee: LG Display Co., Ltd., Seoul (KR)

( * ) Notice: Subject to any disclaimer, the term of this patent is extended or adjusted under 35 U.S.C. 154(b) by 122 days.

(21) Appl. No.: 13/626,569

(22) Filed: Sep. 25, 2012

(65) Prior Publication Data
US 2013/0083092 A1    Apr. 4, 2013

(30) Foreign Application Priority Data

Sep. 30, 2011 (KR) .................... 10-2011-0100127
Jun. 4, 2012 (KR) .................... 10-2012-0059550

(51) Int. Cl.
| G09G 5/10 | (2006.01) |
| G09G 3/36 | (2006.01) |
| G09G 5/04 | (2006.01) |
| G02F 1/1335 | (2006.01) |
| G02F 1/1362 | (2006.01) |

(52) U.S. Cl.
CPC .......... *G09G 3/36* (2013.01); *G09G 2320/0233* (2013.01); *G09G 3/3607* (2013.01); *G02F 2201/40* (2013.01); *G09G 3/3648* (2013.01); *G02F 1/1362* (2013.01); *G09G 5/04* (2013.01); *G02F 1/133514* (2013.01); *G02F 2201/52* (2013.01)
USPC ................. 345/690; 345/87; 345/88

(58) Field of Classification Search
USPC ........................................................ 345/690
See application file for complete search history.

(56) References Cited

U.S. PATENT DOCUMENTS

| 6,014,121 A * | 1/2000 | Aratani et al. ................. 345/89 |
| 2010/0066646 A1* | 3/2010 | Ota .................................. 345/9 |

* cited by examiner

*Primary Examiner* — Charles V Hicks
(74) *Attorney, Agent, or Firm* — Brinks Gilson & Lione

(57) ABSTRACT

Disclosed is a liquid crystal display apparatus which improves uniformity in luminance of RGB pixels by asymmetrically designing RGB pixels, and to enhances display quality, the apparatus comprises a red pixel switching element that switches a driving signal of the red pixel; a green pixel for transmitting green-colored light; a green pixel switching element that switches a driving signal of the green pixel; a blue pixel for transmitting blue-colored light; and a blue pixel switching element that switches a driving signal of the blue pixel, wherein a switching element of at least one pixel having relatively low luminance among the red pixel, green pixel and blue pixel is formed in the pixel area having relatively high luminance.

19 Claims, 14 Drawing Sheets

LIQUID CRYSTAL DISPLAY DEVICE

This application claims the priority and the benefit under 35 U.S.C. §119(a) on Korean Patent Application No. 10-2011-0100127 filed on Sep. 30, 2011 and Korean Patent Application No. 10-2012-0059550, the entire contents of which are hereby incorporated by reference.

BACKGROUND

1. Field of the Invention

The present disclosure relates to a liquid crystal display apparatus, and more particularly, to a liquid crystal display apparatus capable of improving uniformity in luminance of RGB pixels by asymmetrically designing RGB pixels, and enhancing display quality.

2. Discussion of the Related Art

Liquid crystal display apparatus (hereinafter, referred to as 'LCD apparatus') have been widely used owing to development of mass production technology, easiness of driving means, low power consumption, high resolution, and large-sized screen, and furthermore, its application field has been gradually expanded.

FIG. 1 illustrates a pixel structure of an LCD apparatus according to the related art.

Referring to FIG. 1, a plurality of gate lines 10 and data lines 20 are provided in such a manner that the gate line 10 crosses the data line 20, to thereby define a plurality of pixels 30.

The plurality of pixels 30 may include red, green, and blue pixels. One red pixel, one green pixel, and one blue pixel being adjacent each other in a direction constitute one unit pixel.

A data voltage supplied to the pixel 30 is switched through a switching element 40, wherein the data voltage controls transmittance of light emitted from a backlight unit, to thereby display color images. In this case, the switching element 40 is formed of a thin film transistor (TFT).

The LCD apparatus according to the related art is provided in such a manner that the red, green, and blue pixels are designed symmetrically. That is, all pixels have the same length (x) and width (Y). Also, the switching element 40 is identically positioned in the respective red, green, and blue pixels.

A display quality of the LCD apparatus may be determined according to various factors, wherein one of the most important factors is luminance of image. In this case, the luminance of image may vary according to brightness of backlight, luminance properties of color, and light transmittance of pixel including liquid crystal, wherein the light transmittance of pixel is aperture ratio of pixel.

If the brightness of backlight is predetermined and as shown in FIG. 1, all the pixels 30 have the same aperture ratio, the luminance of image may vary mostly according to luminance properties of color. The luminance of white color may vary according to the color properties of the red, green, and blue pixels, wherein the color properties of the red, green, and blue pixels include color coordinates and luminance of the red, green, and blue pixels.

In this case, white colors with different color coordinates are obtained by the color coordinates and luminance combination of the red, green, and blue pixels.

Manufacturers of the LCD apparatus may have the same requirements for the red, green and blue colors, however, may have the different requirements for the white color. For example, some manufacturers require that a color coordinate of white color (X,Y) should be (0.318, 0.318), while other manufacturers require that a color coordinate of white color (X, Y) should be (0.310, 0.320). As mentioned above, a white color in a color coordinate such as (0.310, 0.320) can be obtained by the color coordinates and a luminance combination of the red, green, and blue pixels.

On the luminance properties for each color, the green color is at the high level; the red color is at the intermediate level; and the blue color is at the low level. Supposing that all the pixels have the same aperture ratio, generally. In this case, if the luminance of green pixel is 100%, the luminance of red pixel is 90%, and the luminance of blue pixel is 78%, generally.

Thus, if all of the red, green and blue pixels have the same aperture ratio, a distortion in the color coordinates of the white color may occur due to the different luminance properties of the respective colors under the circumstances that the color coordinates of the red, green, and blue pixels are maintained.

In order to adjust the color coordinates of white color under the circumstances that the color coordinates of the red, green, and blue pixels are maintained, it is necessary to adjust the luminance ratio of the respective red, green and blue pixels.

A method for adjusting the luminance in the red, green, and blue pixels may be carried out by adjusting a gamma value or adjusting light transmittance of the pixels (i.e., aperture ratio of the pixels).

FIG. 2 illustrates a pixel design changed to decrease luminance deviation by each color.

Referring to FIG. 2, the related art LCD apparatus is provided in such a manner that the aperture ratios of the red pixel, green pixel, and blue pixel are adjusted to decrease the luminance deviation by each color.

For example, if the aperture ratio of the blue pixel whose luminance is at the low level is 100%, the aperture ratio of the red pixel may be decreased to 90%, and the aperture ratio of the green pixel may be decreased to 78%. Thus, the luminance deviation by each color may be decreased by adjusting the aperture ratio of the pixels, thereby the color coordinates of white color may be adjusted.

In this case, luminance values of the red pixel, green pixel, and blue pixels are set to the maximum values. Thus, if adjusting the color coordinates of white color by adjusting the aperture ratios of the red pixel, green pixel, and blue pixel, the loss of entire transmittance may occur in a panel, thereby lowering the luminance of image and degrading the display quality.

BRIEF SUMMARY

A liquid crystal display apparatus includes: a red pixel for transmitting red-colored light; a red pixel switching element that switches a driving signal of the red pixel; a green pixel for transmitting green-colored light; a green pixel switching element that switches a driving signal of the green pixel; a blue pixel for transmitting blue-colored light; and a blue pixel switching element that switches a driving signal of the blue pixel, wherein a switching element of at least one pixel having relatively low luminance among the red pixel, green pixel and blue pixel is formed in the pixel area having relatively high luminance.

In another aspect of the present invention, there is provided a liquid crystal display apparatus comprising: a plurality of gate and data lines crossing each other; a red pixel switching element that switches driving of a red pixel; a green pixel switching element that switches driving of a green pixel; and a blue pixel switching element that switches driving of a blue pixel, wherein, a data line that supplies a data voltage to the pixel with relatively low luminance among the red, green and blue pixels is bent toward the pixel with relatively high luminance.

It is to be understood that both the foregoing general description and the following detailed description of the present invention are exemplary and explanatory and are intended to provide further explanation of the invention as claimed.

Accordingly, the LCD apparatuses according to the embodiments of the present invention improve the transmittance of RGB pixels, and adjust the color coordinates of white color.

Also, the LCD apparatuses according to the embodiments of the present invention prevent a distortion in the color coordinates of white color.

In addition, the LCD apparatuses according to the embodiments of the present invention adjust the color coordinates of white color without lowering the transmittance of RGB pixels.

Also, the LCD apparatuses according to the embodiments of the present invention enhance luminance of white color.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Figure 1:
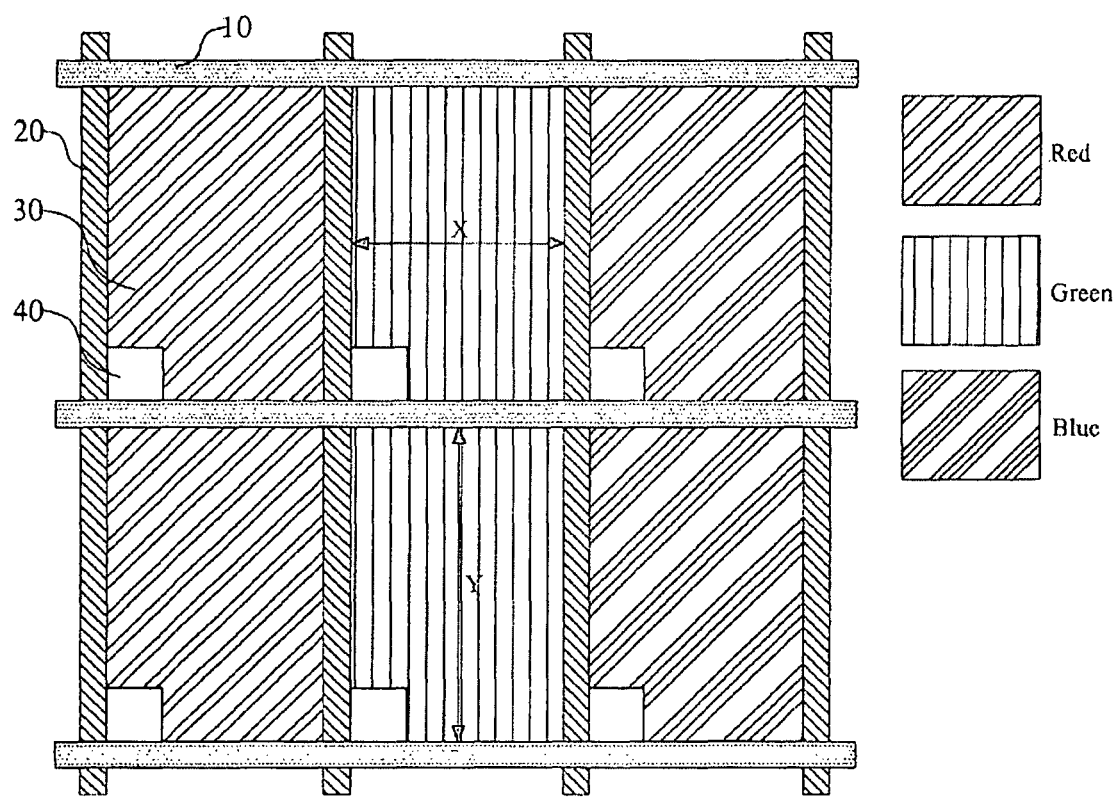
FIG. 1 illustrates a pixel structure of an LCD apparatus according to the related art.
Figure 2:
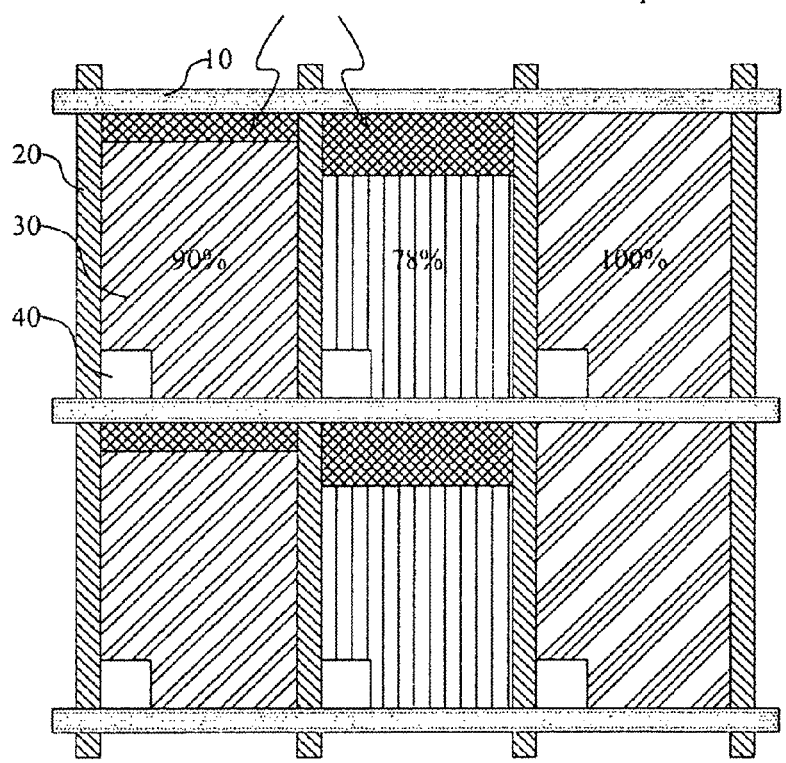
FIG. 2 illustrates a pixel design changed to decrease luminance deviation by each color.

Reference will now be made in detail to the exemplary embodiments of the present invention, examples of which are illustrated in the accompanying drawings. Wherever possible, the same reference numbers will be used throughout the drawings to refer to the same or like parts.

On explanation about the embodiments of the present invention, if it is mentioned that a first structure is positioned 'on or above' or 'under or below' a second structure, it should be understood that the first and structures are brought into contact with each other, or a third structure is interposed between the first and second structures. Herein, the 'structure' may be, for example, an electrode, a line, a wiring layer, or a contact.

Before a detailed explanation with reference to the accompanying drawings, various modes of the LCD apparatus are shown briefly. Based on a method for controlling alignment of liquid crystal layer, the LCD apparatus may be classified into Twisted Nematic (TN) mode, Vertical Alignment (VA) mode, In-Plane Switching (IPS) mode, Fringe Field Switching (FFS) mode, and etc.

In case of the IPS mode and FFS mode among the above modes, pixel and common electrodes are formed on a lower substrate (TFT array substrate), and the alignment of liquid crystal layer is controlled by an electric field formed between the pixel and common electrodes.

Especially, in case of the IPS mode, the pixel and common electrodes are arranged alternately so that an in-plane electric field parallel to the substrates occurs between the pixel and common electrodes, to thereby control the alignment of liquid crystal layer.

In case of the FFS mode, the pixel and common electrodes are formed with a predetermined interval by an insulating layer interposed therebetween. In this case, one of the pixel and common electrodes is formed in a plate shape or pattern, and the other is formed in a finger shape. Thus, the alignment of liquid crystal layer is controlled by a fringe field occurring between the pixel and common electrodes The LCD apparatus according to the embodiment of the present invention may be applied to any of the above TN mode, VA mode, IPS mode, and FFS mode. For the following detailed explanation about the LCD apparatus according to the embodiment of the present invention, and as an example, the FFS mode will be applied to display images.

The LCD apparatus according to the embodiment of the present invention includes a liquid crystal panel for displaying images, a backlight unit for supplying light to the liquid crystal panel, and a driving circuit.

The driving circuit includes a timing controller (T-con), a data driver (D-IC), a gate driver (G-IC), a backlight driver, and a power supplier for supplying driving power to driving circuits. If applying a touch panel, the driving circuit may further include a touch sensing driver.

The backlight unit includes a light source for generating light supplied to the liquid crystal panel, and a plurality of optical members for improving light efficiency.

In this case, the light source may be CCFL (Cold Cathode Fluorescent Lamp), EEFL (External Electrode Fluorescent Lamp), or LED (Light Emitting Diode).

The plurality of optical members may include an LGP (Light Guide Panel), a diffusion film, a prism sheet, and DBEF (Dual Brightness Enhancement Film).

Hereinafter, LCD apparatuses according to the embodiments of the present invention will be described with reference to FIGS. 3 to 14.

Figure 3:
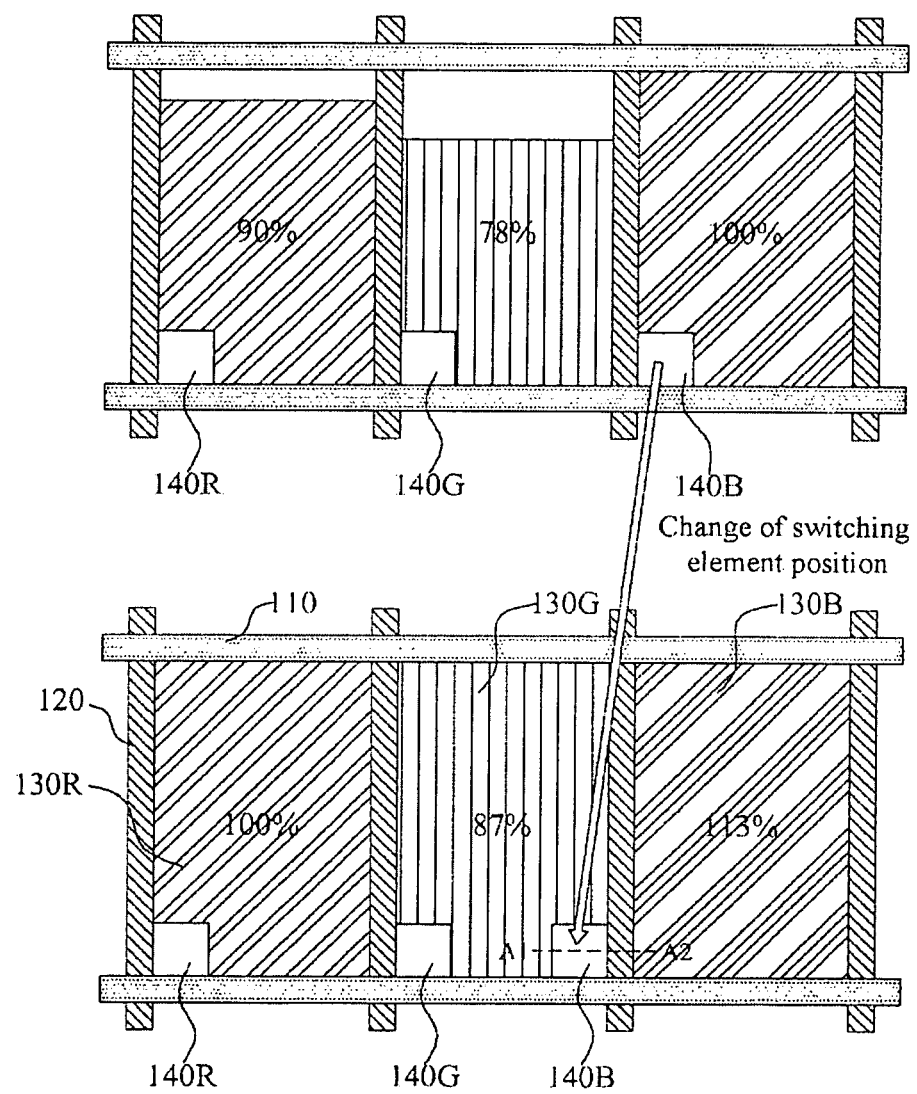
FIG. 3 illustrates a pixel structure of an LCD apparatus according to the first embodiment of the present invention.

FIG. 3 illustrates a pixel structure according to the first embodiment of the present invention. Herein, a backlight unit for supplying light to pixels, and a driving circuit for driving the pixels are not shown in FIG. 3.

Referring to FIG. 3, an LCD apparatus according to the first embodiment of the present invention includes a plurality of gate lines 110 and data lines 120. The plurality of gate lines 110 and data lines 120 are provided in such a manner that the gate line 110 crosses the data line 120, to thereby define a plurality of pixels.

The plurality of pixels may include red pixel 130R, green pixel 130G, and blue pixel 130B, wherein these three-color pixels constitute a unit pixel.

Data voltages supplied to the red pixel 130R, green pixel 130G, and blue pixel 130B are switched through switching elements 140R, 140G, and 140B, respectively, wherein the data voltages control transmittance of light emitted from the backlight unit, to thereby display color images. In this case, the switching elements 140R, 140G, and 140B are formed of thin film transistors (TFT) at corner regions of pixel areas, wherein the corner regions s are adjacent to the crossings of the gate lines 110 and the data lines 120.

The color coordinates of white color are determined by not an absolute space of the red pixel 130R, green pixel 130G, and blue pixel 130B, but a relative space ratio of the pixels. Specifically, the color coordinates of white color are obtained by the color coordinates and luminance combination of the red, green, and blue pixels.

Requirements for the color coordinates of white color may vary according to manufacturers of the LCD apparatus. For adjusting the color coordinates of white color, aperture areas of the red pixel, green pixel, and blue pixel may be designed asymmetrically. That is, aperture ratios of the red pixel, green pixel, and blue pixel may be designed asymmetrically.

For example, among the above three-color pixels, the aperture ratio of the blue pixel with the lowest luminance is designed to be 100%, the aperture ratio of the red pixel is decreased to 90%, and the aperture ratio of the green pixel is decreased to 78%.

However, with respect to the blue pixel, if the aperture ratios of the green and red pixels are decreased so as to adjust the color coordinates of white color, the entire aperture ratio of the unit pixel is decreased so that the luminance of image is lowered.

In the LCD apparatus according to the embodiment of the present invention, the color coordinates of white color may be adjusted by the minimum decrease of the aperture ratio in the red pixel 130R, green pixel 130G, and blue pixel 130B. For this, the switching element position is changed.

For example, among the red pixel 130R, green pixel 130G, and blue pixel 130B, the switching element of the pixel with the relatively low luminance is shifted to the pixel area with the relatively high luminance from the pixel area with the relatively low luminance. That is, the switching element of the pixel with the relatively low luminance may be formed in the pixel area with the relatively high luminance.

According to the peculiar color properties, when the luminance of the green pixel 130G is 100%, the luminance of the red pixel 130R is 90%, and the luminance of the blue pixel 130B is 78%. Thus, the switching element 140B of the blue pixel 130B with the relatively low luminance is shifted to the area of the green pixel 130G with the relatively high luminance.

That is, when the pixels are designed asymmetrically in order to adjust the color coordinates of white color, the switching element 140B of the blue pixel 130B which needs to increase the aperture area may be shifted to the area of the green pixel 130G.

In this case, when the switching element 140B of the blue pixel 130B is shifted to the area of the green pixel 130G, the switching element 140B of the blue pixel 130B may be formed, for example, at a corner region of the green pixel area adjacent to a crossing of the gate lines 110 and the data lines 120 in the same horizontal line (for example, along the extending direction of the gate line) with the switching element 140G of the green pixel 130G.

As shown in FIG. 3, if the switching element 140B of the blue pixel 130B is shifted to the green pixel 130G, the aperture ratio of the red pixel 130R is 100%; the aperture ratio of the green pixel 130G is 87%; and the aperture ratio of the blue pixel 130B is 113%.

When the switching element 140B of the blue pixel 130B with the relatively low luminance is shifted to the green pixel 130G with the relatively high luminance, the aperture ratio of the blue pixel 130B is increased, thereby improving light transmittance of the unit pixel as compared with the related art. Also, the color coordinates of white color may be adjusted without the decrease of the aperture ratio in the unit pixel.

TABLE 1

| | Color coordinates of white color (X, Y) | Transmittance of pixel | | | Transmittance of the unit pixel comparison |
|---|---|---|---|---|---|
| | | R | G | B | |
| Reference | 0.318, 0.348 | 100% | 100% | 100% | 100% |
| The related art | 0.310, 0.320 | 90% | 78% | 100% | 82.0% |
| The present invention | 0.310, 0.320 | 100% | 87% | 113% | 91.5% (11.6% improved) |

Referring to the above Table 1, it is supposed that a reference color coordinate of white color is (0.318, 0.348) and light transmittances of RGB pixels are 100% respectively, and a manufacturer requires that the color coordinate of white color should be adjusted to (0.310, 0.320). In case of the related art, the color coordinates of white color may be adjusted by decreasing the aperture ratio of RGB pixels for the unit pixel. Thus, the light transmittance of unit pixel is decreased to 82% due to the decrease of the aperture ratio of RGB pixels.

Meanwhile, in case of the LCD apparatus according to the embodiment of the present invention, the switching element 140B of the blue pixel 130B whose luminance is relatively lower than that of the green pixel 130G may be shifted to the green pixel 130G with the relatively high luminance. Thus, the aperture ratio of the blue pixel 130B is increased so that the light transmittance of unit pixel is improved by 11.6% in comparison to the related art.

Figure 4:
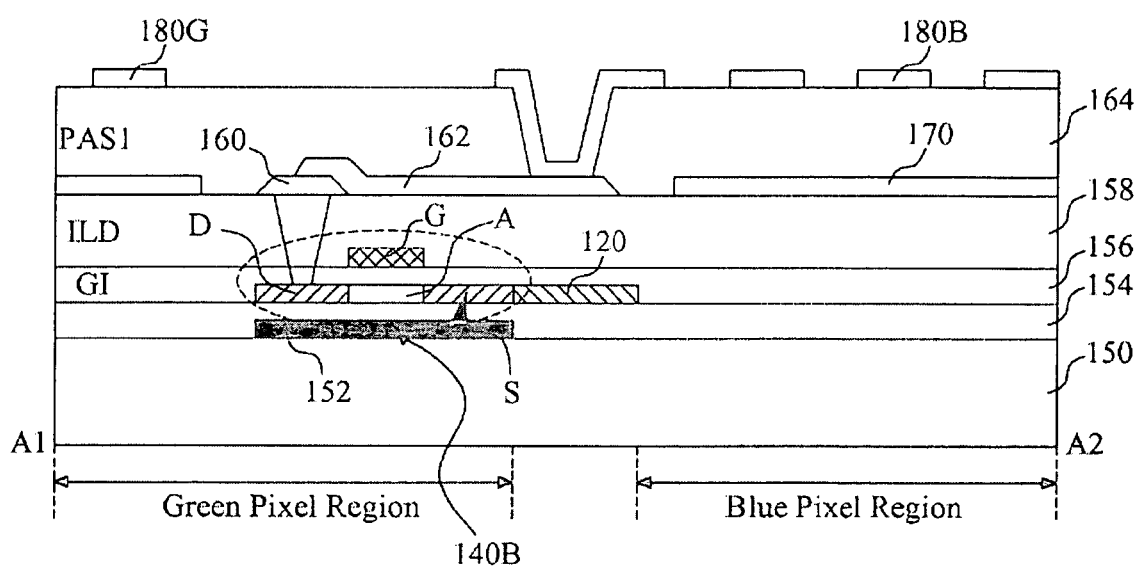
FIG. 4 is a cross sectional view along A1-A2 of FIG. 3, which illustrates a contact structure of a switching element and a pixel electrode according to a change of switching element position.

FIG. 4 is a cross sectional view along A1-A2 of FIG. 3, which illustrates a contact structure of the switching element and pixel electrode according to the change of switching element position.

When the switching element 140B of the blue pixel 130B is shifted to the area of the green pixel 130G, the contact structure for connecting the switching element 140B of the blue pixel 130B with the pixel electrode has to be changed.

For example, as shown in FIG. 4, the pixel structure is changed so that the switching element 140B of the blue pixel 130B, which is shifted to the area of the green pixel 130G, is connected with the pixel electrode 180B of the blue pixel 130B.

FIG. 4 illustrates a lower substrate (TFT array substrate) with a TFT array of a liquid crystal panel, which illustrates some pixels among the entire pixels.

Referring to FIG. 4, the lower substrate of the liquid crystal panel includes a glass substrate 150, a light shield layer 152, a buffer layer 154, a gate insulator (GI) 156, an interlayer dielectric (ILD) 158, a TFT, a first contact 160, a bridge pattern 162, a first passivation layer (PAS1) 164, a common electrode (Vcom electrode) 170, and pixel electrodes 180G and 180B.

The light shield layer 152 is formed in a predetermined area having the TFT on the glass substrate 150, and the buffer layer 154 is formed to cover the light shield layer 152. In this case, the light shield layer 152 prevents light from being incident on the TFT, to thereby prevent a light-leakage current. The light shield layer 152 may be formed of molybdenum (Mo) or aluminum (Al), wherein the light shield layer 152 may have a thickness of 500 Å.

The buffer layer 154 may be formed of an inorganic material, for example, $SiO_2$ or SiNx, wherein the buffer layer 154 may have a thickness of 2,000 Å~3,000 Å.

A data line 120 is formed on the buffer layer 154. In FIG. 4, the green pixel 130G is formed at one side with respect to the data line 120, and the blue pixel 130G is formed at the other side.

Also, active (A), source (S), and drain (D) of the TFT are formed on the buffer layer 154, wherein the active (A), source (S), and drain (D) are positioned in an overlap area between the buffer layer 154 and the light shield layer 152. The source (S) and drain (D) are formed simultaneously with the data line 120.

In this case, the active (A) may be formed of low-temperature polysilicon (P—Si), wherein the active (A) may have a thickness of 500 Å. The source (S) and drain (D) may be formed by doping a semiconductor layer with P-type or N-type dopant.

The gate insulator (GI) 156 is formed on an entire surface of the buffer layer 154, to thereby cover the active (A), source (S), and drain (D). In this case, the gate insulator 156 may be formed of $SiO_2$, wherein the gate insulator 156 may have a thickness of 1,300 Å.

The gate insulator 156 may be formed by depositing TEOS (Tetra Ethyl Ortho Silicate) or MTO (Middle Temperature Oxide) in a CVD method (Chemical Vapor Deposition).

A gate (G) is formed on a predetermined portion of the gate insulator 156, wherein the gate (G) is positioned in an overlap area between the active (A) and the gate insulator 156. In this case, the gate (G) may be formed of molybdenum (Mo) or aluminum (Al), and may have a thickness of 3,000 Å. Accordingly, the gate (G) is formed together with the active (A)/source (S)/drain (D) under the circumstance that the gate insulator 156 is interposed therebetween, to thereby form the TFT.

Then, the switching element is formed to drive the pixels through the TFT. FIG. 4 illustrates the TFT with a top gate structure, but not necessarily. That is, the TFT may be formed in a bottom gate structure instead of the top gate structure.

Among the red pixel 130R, green pixel 130G and blue pixel 130B, if the pixels are designed asymmetrically to adjust the color coordinates of white color in the LCD apparatus according to the present invention, the switching element 140B of the blue pixel 130B with the relatively low luminance is formed in the area of the green pixel 130G with the relatively high luminance. That is, the switching element 140B of the blue pixel 130B which needs to increase the aperture area is formed in the area of the green pixel 130G which is capable of decreasing the aperture area.

The interlayer dielectric (ILD) 158 is formed on the gate insulator 156, to thereby cover the gate (G). In this case, the interlayer dielectric 158 may be formed of $SiO_2$ or SiNx, wherein the interlayer dielectric 158 may have a thickness of 6,000 Å. In another example structure, the interlayer dielectric 158 may be formed in a structure of $SiO_2$ (3,000 Å)/SiNx (3,000 Å).

In the area of the green pixel 130G, there is the first contact 160 where the switching element 140B of the blue pixel 130B is brought into contact with the drain (D). In this case, the first contact 160 may have a thickness of 6,000 Å or more. The first contact 160 may be formed in a sequential deposition structure of molybdenum (Mo)/aluminum (Al)/molybdenum (Mo).

The bridge pattern 162 is formed on the interlayer dielectric 158. The bridge pattern 162 crosses the green pixel 130G and blue pixel 130B. One side of the bridge pattern 162 is connected with the first contact 160 of the green pixel 130G, and the other side of the bridge pattern 162 is connected with the blue pixel electrode 180B formed in the area of the blue pixel 130B.

The first passivation layer (PAS1) 164 is formed on the interlayer dielectric 158, wherein the first passivation layer 164 covers the first contact 160. In this case, the first passivation layer 164 may be formed of photo acryl, and may have a thickness of 3 μm.

The common electrode (Vcom electrode) 170 is formed on the interlayer dielectric 158 in an aperture area.

The common electrode 170 may be formed of a transparent conductive material such as ITO (Indium Tin Oxide), IZO (Indium Zinc Oxide), or ITZO (Indium Tin Zinc Oxide), and the common electrode 170 may have a thickness of 500 Å.

The pixel electrode on the first passivation layer 164 (PAS1) is formed in a finger shape.

In this case, a green pixel electrode 180G is formed in the area of the green pixel 130G, and a blue pixel electrode 180B is formed in the area of the blue pixel 130B. The pixel electrodes 180G and 180B may be formed of a transparent conductive material such as ITO (Indium Tin Oxide), IZO (Indium Zinc Oxide), or ITZO (Indium Tin Zinc Oxide), and each of the pixel electrodes 180G and 180B may have a thickness of 500 Å.

In this case, the switching element 140B of the blue pixel 130B formed in the green pixel 130G is brought into contact with the blue pixel electrode 180B through the first contact 160, and bridge pattern 162.

The first passivation layer (PAS1) 164 and pixel electrodes 180G and 180B may be simultaneously formed by a mask process using a halftone mask (HTM).

Owing to the above structure of the lower substrate, the switching element 140B of the blue pixel 130B formed in the area of the green pixel 130G may be in contact with the blue pixel electrode 180B.

In the LCD apparatus according to the embodiment of the present invention, the switching element 140B of the blue pixel 130B with the relatively low luminance is shifted to the green pixel 130G with the relatively high luminance. In this case, according as the aperture ratio of the red pixel 130R is 100%, the aperture ratio of the green pixel 130G is 87%, and the aperture ratio of the blue pixel 130B is increased to 113%. Thus, the aperture ratio of the unit pixel is increased, and the color coordinates of white color are adjusted.

Figure 5:
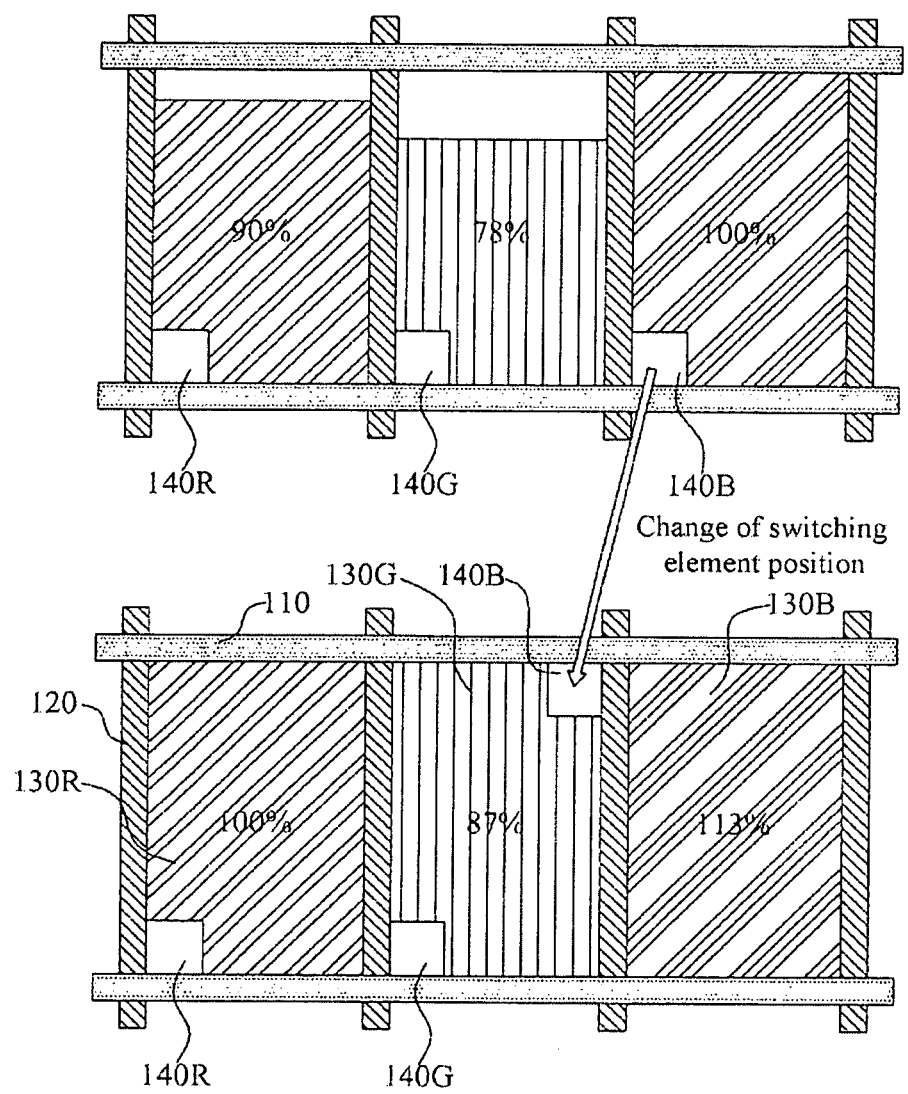
FIG. 5 illustrates a pixel structure of an LCD apparatus according to the second embodiment of the present invention.

FIG. 5 illustrates a pixel structure of an LCD apparatus according to the second embodiment of the present invention.

Referring to FIG. 5, in case of the LCD apparatus according to the second embodiment of the present invention, among the red pixel 130R, green pixel 130G, and blue pixel 130B, the switching element of the pixel with the relatively low luminance is shifted to the pixel with the relatively high luminance.

In more detail, the switching element 140B of the blue pixel 130B whose luminance is relatively lower than that of the green pixel 130G is shifted to the area of the green pixel 130G with the relatively high luminance.

That is, if it needs to asymmetrically design the pixels in order to adjust the color coordinates of white color, the switching element 140B of the blue pixel 130B which needs to increase the aperture area may be formed in the area of the green pixel 130G.

When the switching element 140B of the blue pixel 130B is formed in the area of the green pixel 130G, the switching element 140B of the blue pixel 130B may be positioned at, for example, a corner region of the green pixel area adjacent to a crossing of the gate lines 110 and the data lines 120 diagonally to the switching element 140G of the green pixel 130G.

Figure 6:
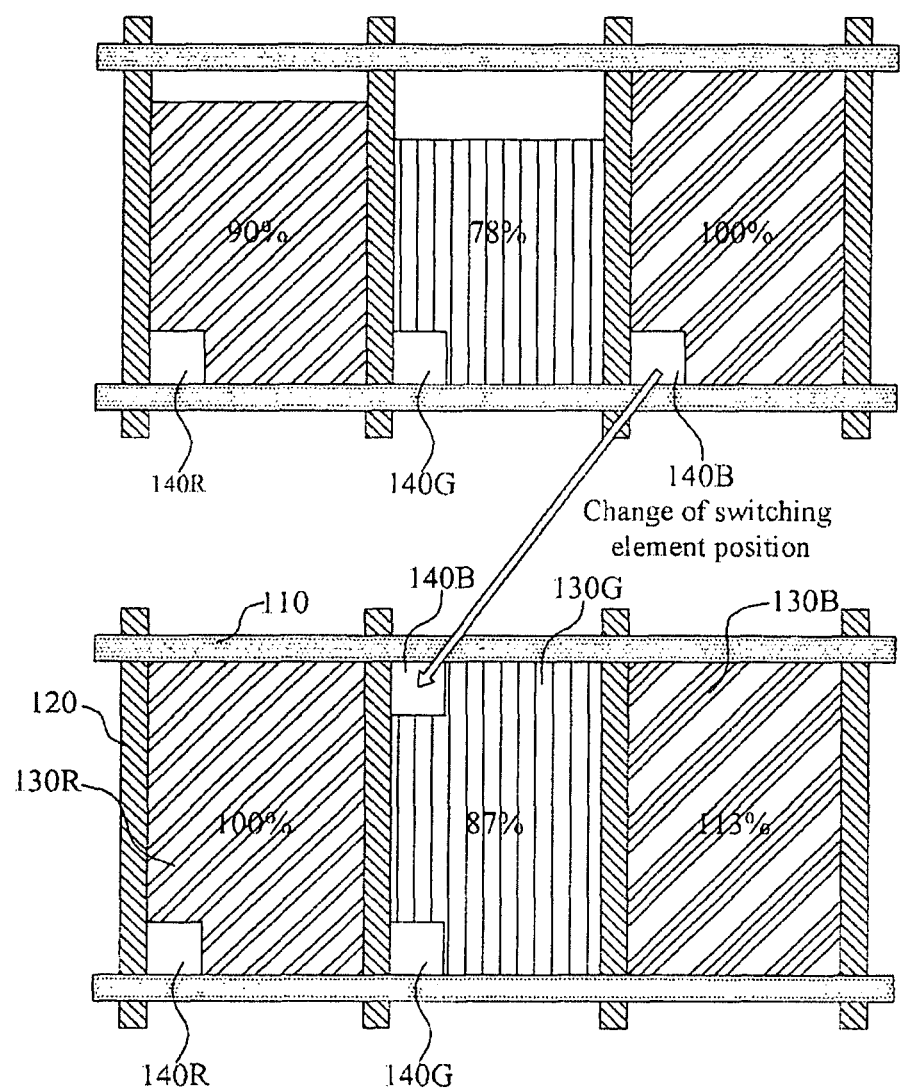
FIG. 6 illustrates a pixel structure of an LCD apparatus according to the third embodiment of the present invention.

FIG. 6 illustrates a pixel structure of an LCD apparatus according to the third embodiment of the present invention.

Among the red pixel 130R, green pixel 130G and blue pixel 130B, as shown in FIG. 6, in case of the LCD apparatus according to the third embodiment of the present invention, the switching element of the pixel with the relatively low luminance is shifted to the pixel with the relatively high luminance.

In more detail, the switching element 140B of the blue pixel 130B whose luminance is relatively lower than that of the green pixel 130G is shifted to the area of the green pixel 130G with the relatively high luminance.

That is, if it needs to asymmetrically design the pixels in order to adjust the color coordinates of white color, the switching element 140B of the blue pixel 130B which needs to increase the aperture area may be formed in the area of the green pixel 130G.

When the switching element 140B of the blue pixel 130B is formed in the area of the green pixel 130G, the switching element 140B of the blue pixel 130B may be positioned at, for example, a corner region of the green pixel area adjacent to a crossing of the gate lines 110 and the data lines 120 in the same vertical line (for example, along the extending direction of the data line) with the switching element 140G of the green pixel 130G.

Figure 7:
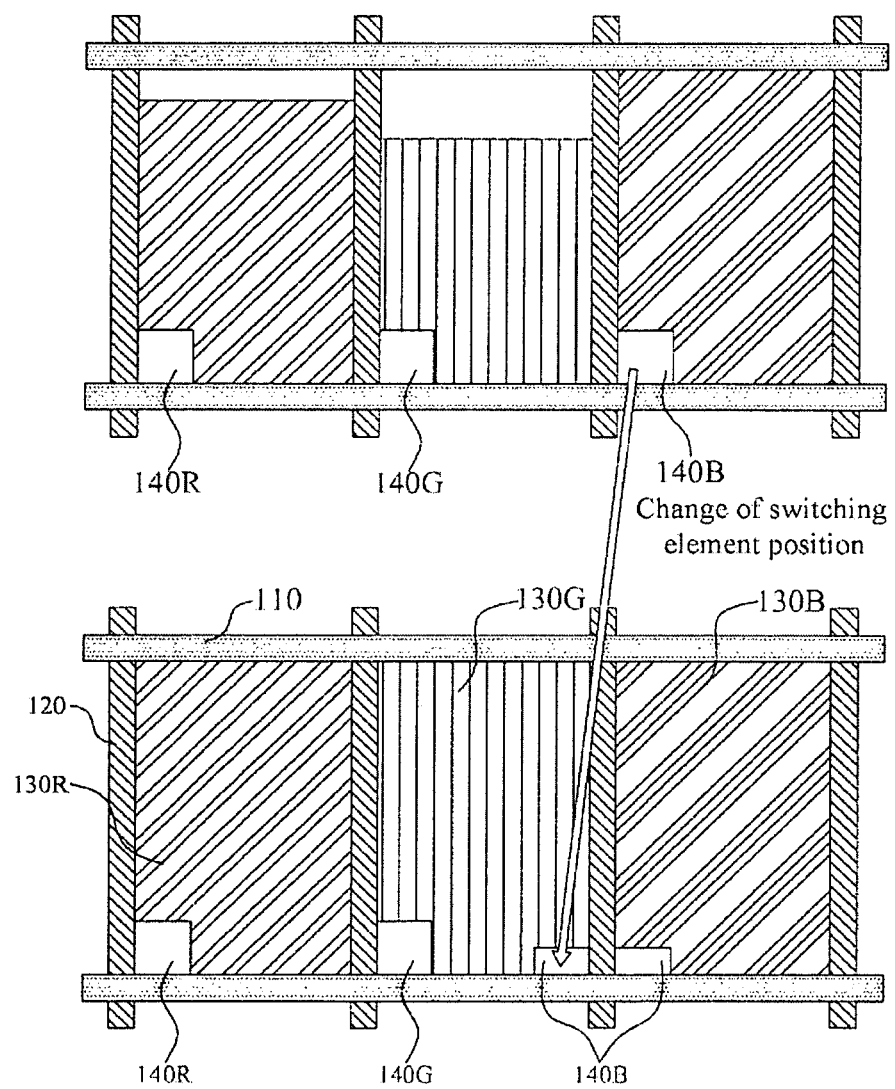
FIG. 7 illustrates a pixel structure of an LCD apparatus according to the fourth embodiment of the present invention.

FIG. 7 illustrates a pixel structure of an LCD apparatus according to the fourth embodiment of the present invention.

Among the red pixel 130R, green pixel 130G, and blue pixel 130B, as shown in FIG. 7, in case of the LCD apparatus according to the fourth embodiment of the present invention, a predetermined portion of the switching element of the pixel with the relatively low luminance is shifted to the pixel with the relatively high luminance.

In more detail, a predetermined portion of the switching element 140B of the blue pixel 130B whose luminance is relatively lower than that of the green pixel 130G is shifted to the area of the green pixel 130G with the relatively high luminance.

That is, if it needs to asymmetrically design the pixels in order to adjust the color coordinates of white color, the predetermined portion of the switching element 140B of the blue pixel 130B which needs to increase the aperture area may be formed in the area of the green pixel 130G. For example, the half of the switching element 140B of the blue pixel 130B may be formed at a corner region of the blue pixel area adjacent to a crossing of the gate lines 110 and the data lines 120 in the area of the blue pixel 130B, and the other half thereof may be formed at a corner region of the green pixel area adjacent to the same crossing of the gate lines 110 and the data lines 120 in the area of the green pixel 130G.

In this case, the predetermined portion of the switching element 140B of the blue pixel 130B formed in the green pixel 130G may be positioned in the same horizontal line (for example, along the extending direction of the gate line) with the switching element 140G of the green pixel 130G.

Figure 8:
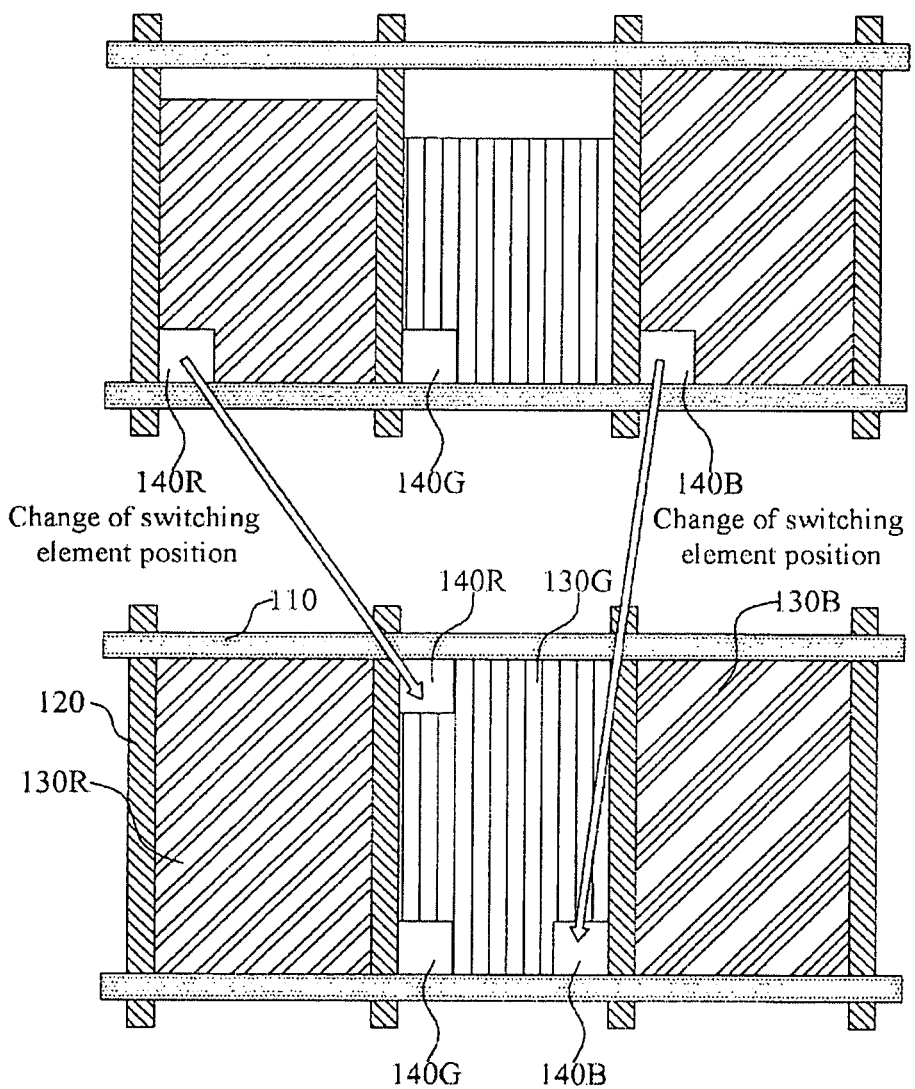
FIG. 8 illustrates a pixel structure of an LCD apparatus according to the fifth embodiment of the present invention.

FIG. 8 illustrates a pixel structure of an LCD apparatus according to the fifth embodiment of the present invention.

Among the red pixel 130R, green pixel 130G and blue pixel 130B, as shown in FIG. 8, in case of the LCD apparatus according to the fifth embodiment of the present invention, the switching elements of the pixels with the relatively low luminance are shifted to the pixel with the relatively high luminance.

In more detail, the switching elements 140R and 140B of the red pixel 130R and blue pixel 130B whose luminance is relatively lower than that of the green pixel 130G are shifted to the area of the green pixel 130G with the relatively high luminance.

That is, if it needs to asymmetrically design the pixels in order to adjust the color coordinates of white color, the switching elements 140R and 140B of the red pixel 130R and blue pixel 130B which need to increase the aperture area may be formed in the area of the green pixel 130G.

When the switching element 140B of the blue pixel 130B is formed in the area of the green pixel 130G, the switching element 140B of the blue pixel 130B may be positioned at, for example, a corner region of the green pixel area adjacent to a crossing of the gate lines 110 and the data lines 120 in the same horizontal line (for example, along the extending direction of the gate line) with the switching element 140G of the green pixel 130G.

Also, when the switching element 140R of the red pixel 130R is formed in the area of the green pixel 130G, the switching element 140R of the red pixel 130R may be positioned at, for example, another corner region of the green pixel area adjacent to another crossing of the gate lines 110 and the data lines 120 in the same vertical line (for example, along the extending direction of the data line) with the switching element 140G of the green pixel 130G.

Figure 9:
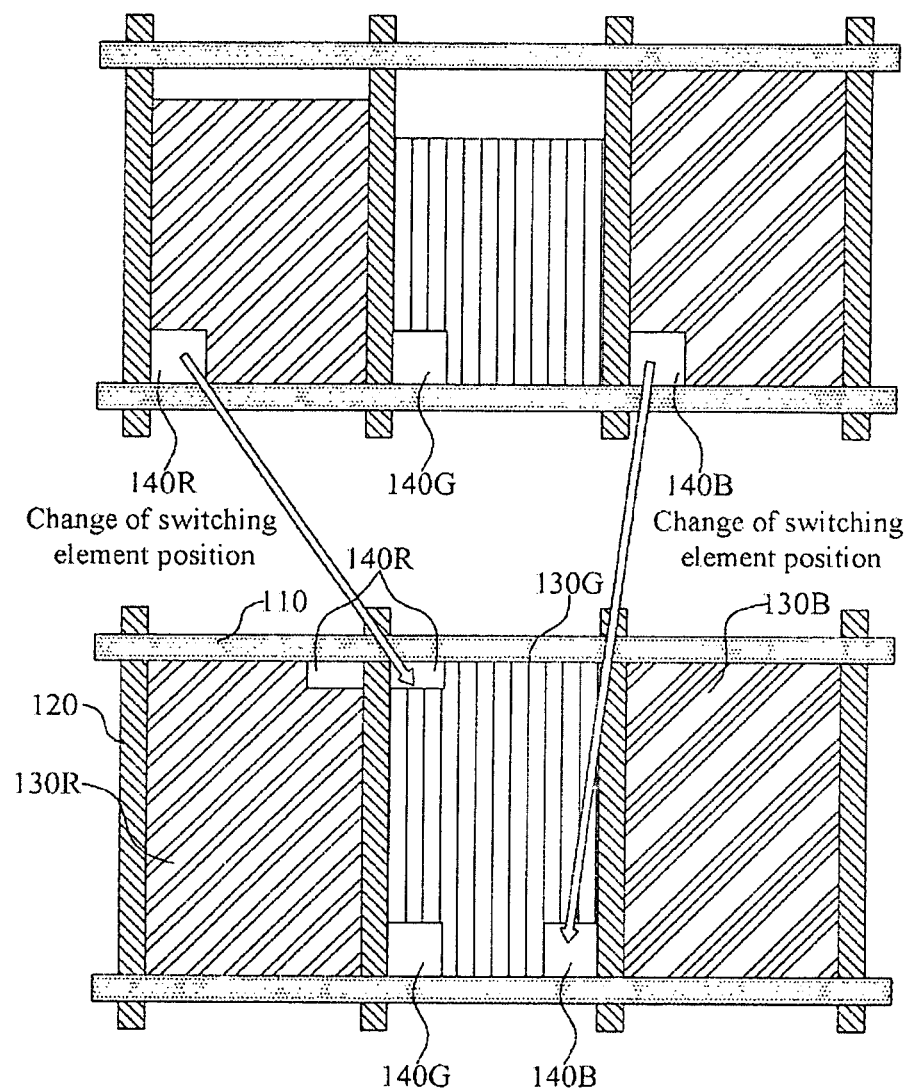
FIG. 9 illustrates a pixel structure of an LCD apparatus according to the sixth embodiment of the present invention.

FIG. 9 illustrates a pixel structure of an LCD apparatus according to the sixth embodiment of the present invention.

Among the red pixel 130R, green pixel 130G and blue pixel 130B, as shown in FIG. 9, in case of the LCD apparatus according to the sixth embodiment of the present invention, the switching elements of the pixels with the relatively low luminance are shifted to the pixel with the relatively high luminance.

In more detail, the switching element 140B of the blue pixel 130B whose luminance is relatively lower than that of the green pixel 130G may be shifted to the area of the green pixel 130G with the relatively high luminance.

Also, a predetermined portion of the switching element 140R of the red pixel 130R whose luminance is relatively lower than that of the green pixel 130G may be shifted to the area of the green pixel 130G with the relatively high luminance.

That is, if it needs to asymmetrically design the pixels in order to adjust the color coordinates of white color, the entire switching element 140B of the blue pixel 130B and the predetermined portion of the switching element 140R of the red pixel 130R, which need to increase the aperture area, may be formed in the area of the green pixel 130G.

In this case, the switching element 140B of the blue pixel 130B may be positioned at, for example, a corner region of the green pixel area adjacent to a crossing of the gate lines 110 and the data lines 120 in the same horizontal line (for example, along the extending direction of the gate line) with the switching element 140G of the green pixel 130G, and the predetermined portion of the switching element 140R of the red pixel 130R may be positioned at, for example, another corner region of the green pixel area adjacent to another crossing of the gate lines 110 and the data lines 120 in the same vertical line (for example, along the extending direction of the data line) with the switching element 140G of the green pixel 130G.

In case of the LCD apparatuses according to the embodiment of the present invention shown in FIGS. 3 to 9, the red pixel 130R, green pixel 130G, and blue pixel 130B have the same breadth (X) and length (Y), in other words, the red pixel 130R, green pixel 130G, and blue pixel 130B may have the same breadths (X), and have the same lengths (Y), but not limited to these. The red pixel 130R, green pixel 130G, and blue pixel 130B may have the different breadths (X) and lengths (Y), respectively. In other words, the red pixel 130R, green pixel 130G, and blue pixel 130B may have different breadths (X), respectively, and/or may have different lengths (Y).

In the case that the red pixel 130R, green pixel 130G, and blue pixel 130B have the different breadths (X) and lengths (Y), respectively, a switching element of at least one pixel with the relatively low luminance among the RGB pixels may be formed in the area of the pixel with the relatively high luminance; and at least one of the breadths (X) and lengths (Y) of the red pixel 130R, green pixel 130G and blue pixel 130B may be adjusted, to thereby adjust the color coordinates of white color without the decrease of aperture ratio with respect to the unit pixel.

In the above LCD apparatuses according to the embodiments of the present invention, at least one of the switching elements 140B and 140R of the blue pixel 130B and red pixel 130R whose luminance is relatively lower than that of the green pixel 130G may be totally or partially shifted to the green pixel 130G with the relatively high luminance, to thereby increase the aperture ratio of the unit pixel.

Also, the above LCD apparatuses according to the embodiments of the present invention improve the transmittance of RGB pixels, and adjust the color coordinates of white color without the decrease of the aperture ratio with respect to the unit pixel.

In the above LCD apparatuses according to the embodiments of the present invention, at least one of the switching elements 140B and 140R of the blue pixel 130B and red pixel 130R whose luminance is relatively lower than that of the green pixel 130G may be totally or partially shifted to the green pixel 130G with the relatively high luminance, to thereby prevent distortion of the white color.

Figure 10:
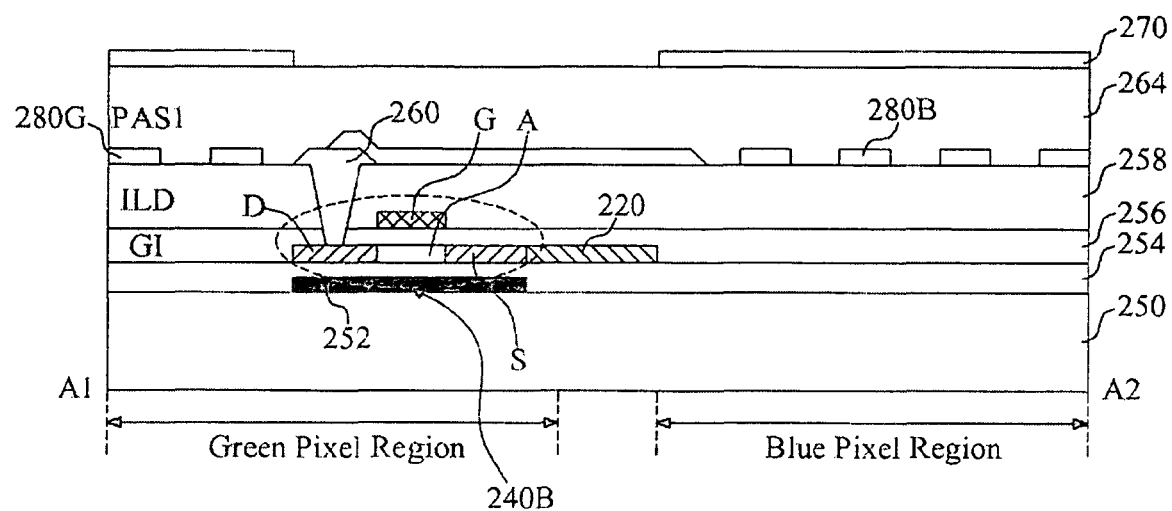
FIG. 10 illustrates a contact structure between switching element and pixel electrode by the change of switching element position according to another embodiment of the present invention.

FIG. 10 illustrates a contact structure between switching element and pixel electrode by the change of switching element position according to another embodiment of the present invention.

Referring to FIG. 10, a switching element 240B of blue pixel, which is shifted to a region of green pixel, may be connected with a pixel electrode 280B of blue pixel by forming a pixel structure.

A light shield layer 252 is formed in a predetermined area having a TFT on a glass substrate 150, and a buffer layer 254 is formed to cover the light shield layer 252.

A data line 220 is formed on the buffer layer 254. In FIG. 10, the green pixel is formed at one side with respect to the data line 220, and the blue pixel is formed at the other side.

Also, active (A), source (S), and drain (D) of the TFT are formed on the buffer layer 254, wherein the active (A), source (S), and drain (D) are positioned in an overlap area between the buffer layer 254 and the light shield layer 252.

A gate insulator 256 is formed on an entire surface of the buffer layer 254, to thereby cover the active (A), source (S), and drain (D).

A gate (G) is formed on a predetermined portion of the gate insulator 256, wherein the gate (G) is positioned in an overlap area between the active (A) and the gate insulator 256. Accordingly, the gate (G) is formed together with the active (A)/source (S)/drain (D) under the circumstance that the gate insulator 256 is interposed therebetween, to thereby form the TFT.

Then, an interlayer dielectric (ILD) 258 is formed on the gate insulator 256, to thereby cover the gate (G).

In the region of green pixel, there is provided a first contact 260 connected with the drain (D) of the blue pixel switching element 240B.

On the interlayer dielectric 258, there are a bridge pattern 262 and a pixel electrode. The bridge pattern 262 crosses the green pixel and blue pixel. One side of the bridge pattern 262 is connected with the first contact 260 of the green pixel, and the other side of the bridge pattern 262 is connected with the blue pixel electrode 280B in the blue pixel region. That is, the switching element 240B of the blue pixel formed in the green pixel is brought into contact with the blue pixel electrode, 280B through the first contact 260 and bridge pattern 262.

In this case, the bridge pattern 262 may be formed together with the pixel electrode, and may be formed of a transparent conductive material such as ITO (Indium Tin Oxide), IZO (Indium Zinc Oxide), or ITZO (Indium Tin Zinc Oxide).

A first passivation layer (PAS1) 264 is formed on the interlayer dielectric 258, wherein the first passivation layer 264 covers the first contact 160.

A common electrode (Vcom electrode) 270 is formed on the first passivation layer 264.

Through the aforementioned structure of lower substrate, the switching element 240B of the blue pixel formed in the green pixel region may be brought into contact with the blue pixel electrode 280B.

For the aforementioned description, at least one of switching elements of red pixel and blue pixel is shifted to the green pixel region, which corresponds to one of the various embodiments of the present invention. According to another embodiment of the present invention, the switching element of green pixel may be totally or partially shifted to the red pixel region or blue pixel region.

Figure 11:
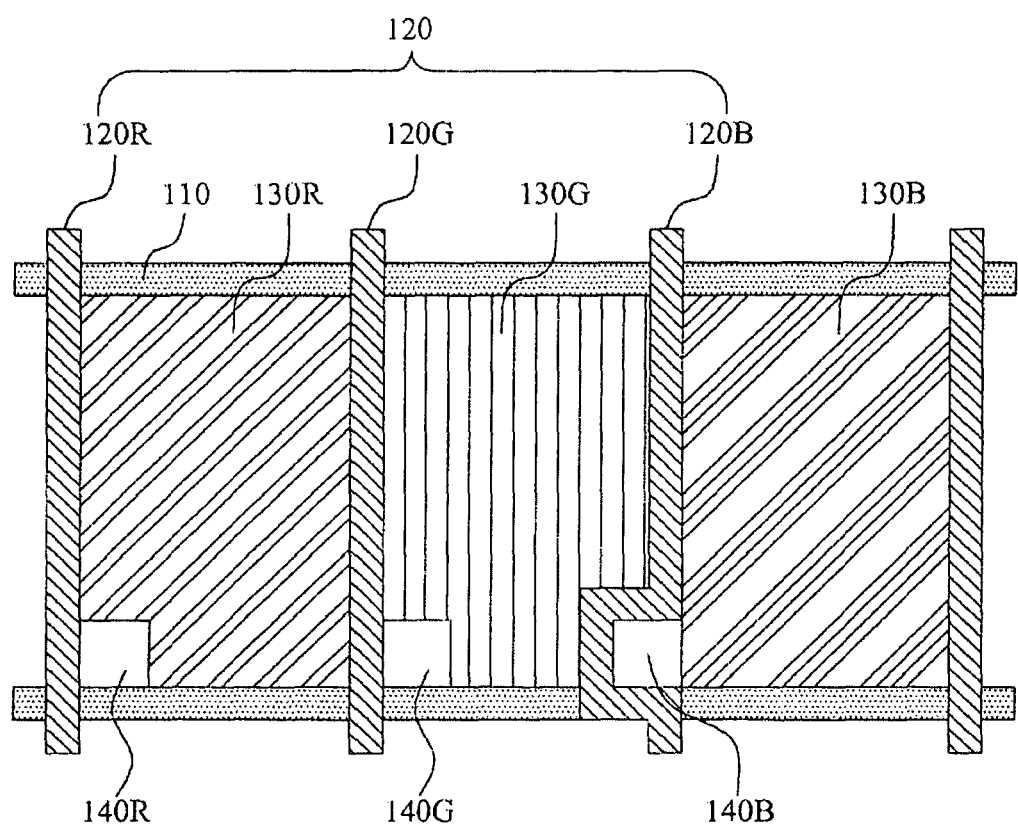
FIG. 11 illustrates a pixel structure of an LCD apparatus according to the seventh embodiment of the present invention.

FIG. 11 illustrates a pixel structure of an LCD apparatus according to the seventh embodiment of the present invention.

Referring to FIG. 11, the LCD apparatus according to the seventh embodiment of the present invention is provided with red pixel 130R, green pixel 130G, and blue pixel 130B whose areas are asymmetrically designed. In this case, an area of the pixel with relatively low luminance is larger in size than an area of the pixel with relatively high luminance.

In more detail, among the red pixel 130R, green pixel 130G and blue pixel 130B, the pixel with relatively low luminance is increased in area size. In this case, the area size of the pixel with relatively low luminance is increased by an area corresponding to a switching element.

Among data lines 120, a partial portion of blue data line 120B is bent toward the green pixel 130G, wherein the blue data line 120B is supplied with a data voltage of the blue pixel 130B. In this case, the switching element 140B of blue pixel 130B is formed in a space prepared by bending the blue data line 120B.

By bending the blue data line 120B, the green pixel 130G with relatively high luminance is decreased in area size, and the blue pixel 130B with relatively low luminance is increased in area size.

As shown in FIG. 11, the area of blue pixel 130B is increased by an area corresponding to the switching element 140B of blue pixel 130B, whereby transmittance is enhanced by the increase of aperture ratio in the blue pixel 130B. Also, it is possible to adjust the color coordinates of white color without decreasing the aperture ratio in a unit pixel.

Figure 12:
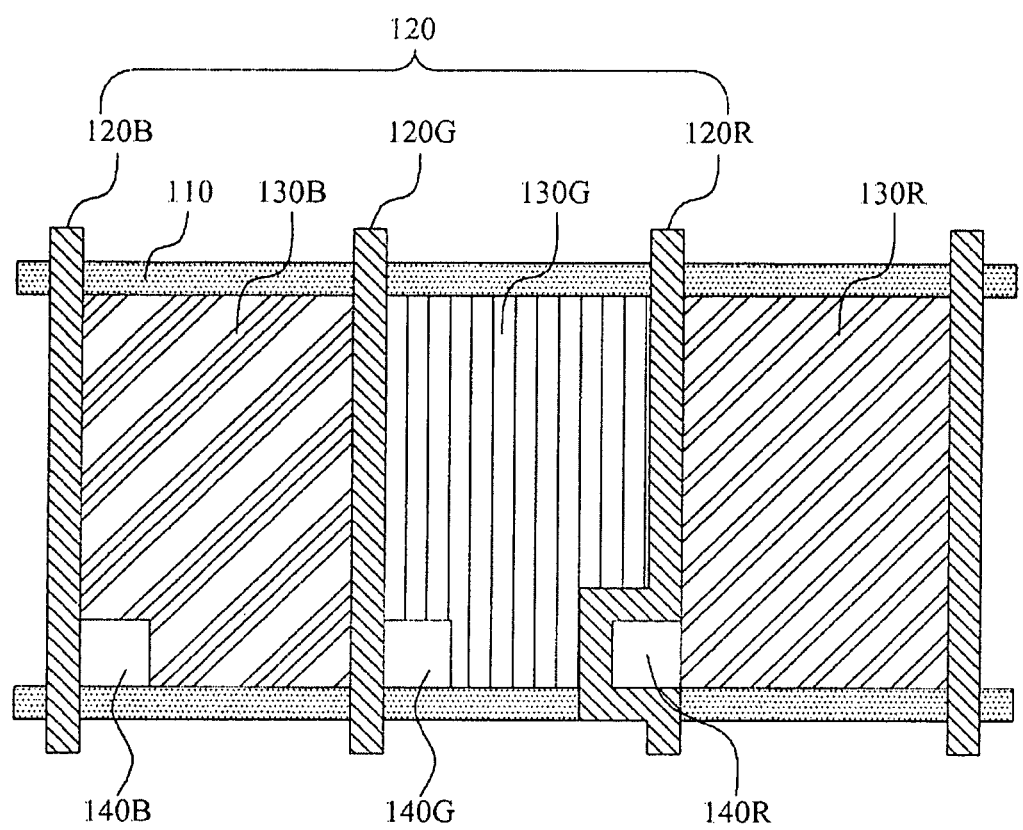
FIG. 12 illustrates a pixel structure of an LCD apparatus according to the eighth embodiment of the present invention.

Referring to FIG. 12, an LCD apparatus according to the eighth embodiment of the present invention is provided with red pixel 130R, green pixel 130G, and blue pixel 130B, wherein the red pixel 130R with relatively low luminance is increased in area size. In this case, the area size of the red pixel 130R with relatively low luminance is increased by an area corresponding to a switching element 140R.

Among data lines 120, a partial portion of red data line 120R is bent toward the green pixel 130G, wherein the red data line 120R is supplied with a data voltage of the red pixel 130R. In this case, the switching element 140R of red pixel 130R is formed in a space prepared by bending the red data line 120R.

By bending the red data line 120R, the green pixel 130G with relatively high luminance is decreased in area size, and the red pixel 130R with relatively low luminance is increased in area size.

As shown in FIG. 12, the area of red pixel 130R is increased by an area corresponding to the switching element 140R of red pixel 130R, whereby transmittance is enhanced by the increase of aperture ratio in the red pixel 130R. Also, it is possible to adjust the color coordinates of white color without decreasing the aperture ratio in a unit pixel.

Among data lines 120, although not shown, a partial portion of blue data line 120B supplied with a data voltage of blue pixel 130B may be bent toward the green pixel 130G, and a partial portion of red data line 120R supplied with a data voltage of red pixel 130R may be bent toward the green pixel 130G.

Accordingly, the green pixel 130G with relatively high luminance may be decreased in area size, and the red pixel 130R and blue pixel 130B with relatively low luminance may be increased in area size.

Among data lines 120, although not shown, there may be provided another embodiment accomplished by bending a partial portion of green data line 120G supplied with a data voltage of green pixel 130R toward the red pixel 130R or blue pixel 130B.

Figure 13:
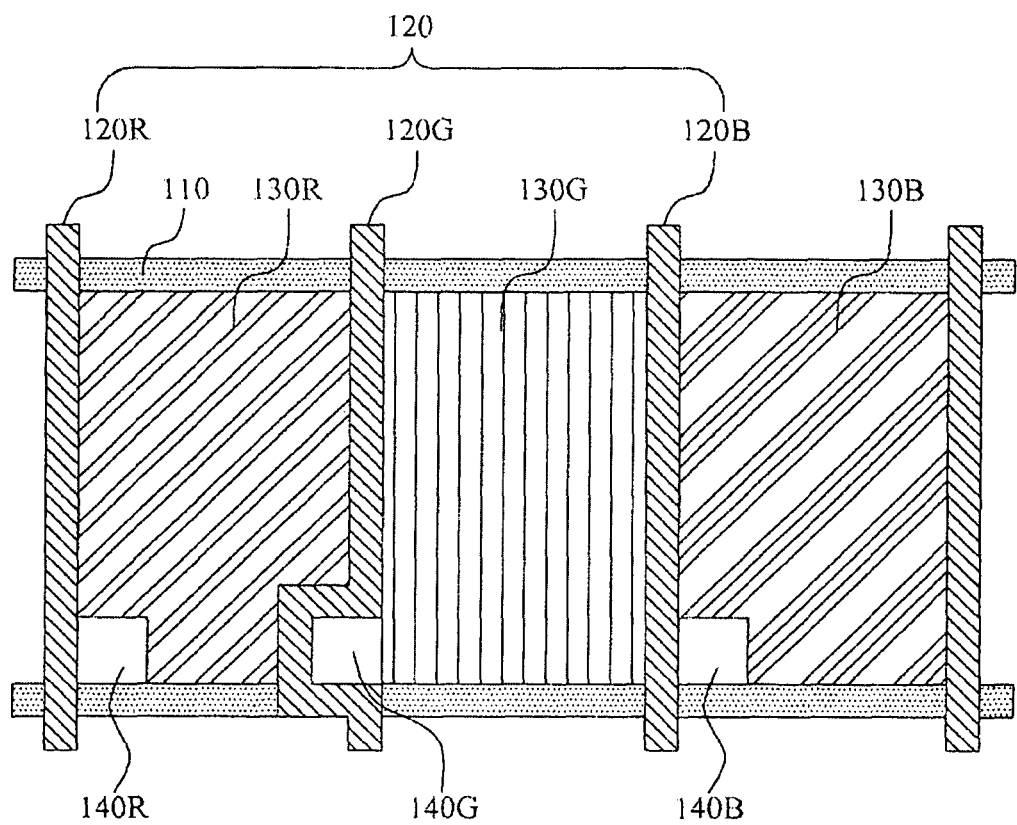
FIG. 13 illustrates a pixel structure of an LCD apparatus according to the ninth embodiment of the present invention.

FIG. 13 illustrates a pixel structure of an LCD apparatus according to the ninth embodiment of the present invention.

Referring to FIG. 13, among data lines 120 in the LCD apparatus according to the ninth embodiment of the present invention, a partial portion of green data line 120G is bent toward the red pixel 130R, wherein the green data line 120G is supplied with a data voltage of the green pixel 130G.

Although not shown, a partial portion of green data line 120G may be bent toward the blue pixel 130B, wherein the green data line 120G is supplied with a data voltage of the green pixel 130G.

In this case, the area of green pixel 130G is increased by an area corresponding to a switching element 140G of green pixel 130G. The switching element 140G of green pixel 130G is formed in a space prepared by bending the green data line 120G.

As shown in FIG. 13, the area of green pixel 130G is increased by an area corresponding to the switching element 140G of green pixel 130G, whereby transmittance is enhanced by the increase of aperture ratio in the green pixel 130G. Also, it is possible to adjust the color coordinates of white color without decreasing the aperture ratio in a unit pixel.

Figure 14:
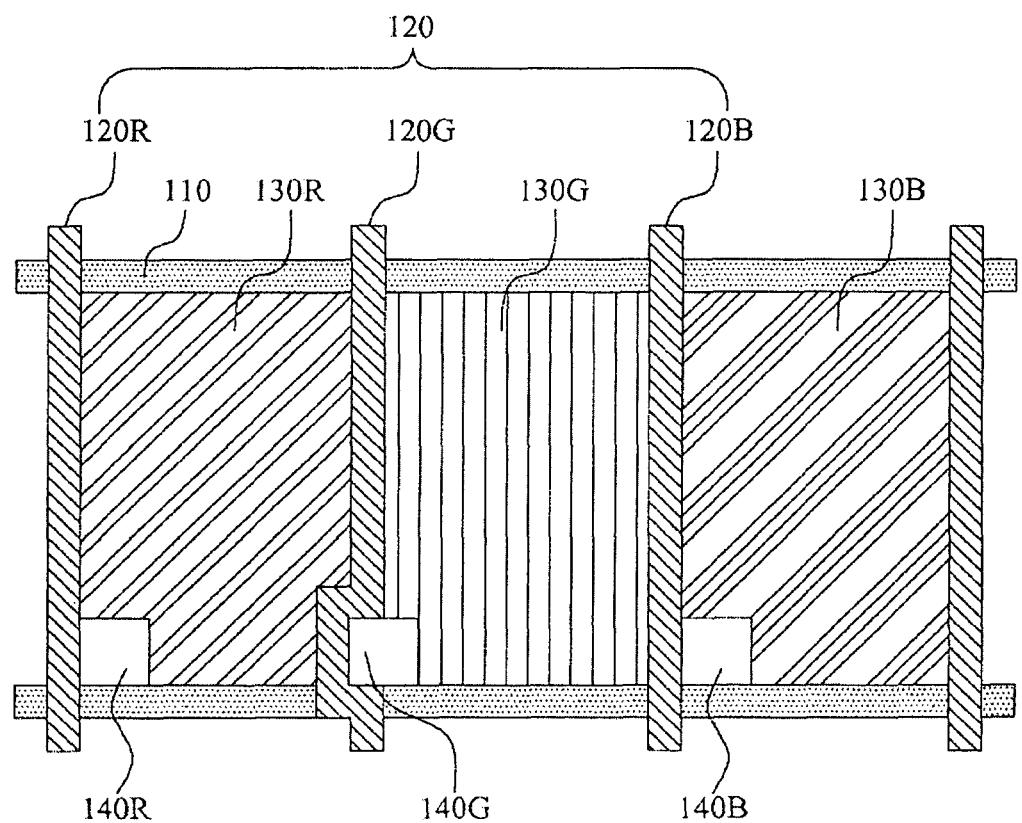
FIG. 14 illustrates a pixel structure of an LCD apparatus according to the tenth embodiment of the present invention.

FIG. 14 illustrates a pixel structure of an LCD apparatus according to the tenth embodiment of the present invention.

Referring to FIG. 14, among data lines 120 in the LCD apparatus according to the tenth embodiment of the present invention, a partial portion of green data line 120G is bent toward the red pixel 130R, wherein the green data line 120G is supplied with a data voltage of the green pixel 130G. In this case, it is possible to adjust a space prepared by bending the green data line 120G.

A partial portion of a switching element 140G of the green pixel 130G is formed in the space prepared by bending the green data line 120G, and the remaining portions of the switching element 140G of the green pixel 130G are formed in the area of green pixel 130G.

Although not shown, a partial portion of green data line 120G may be bent toward the blue pixel 130B, wherein the green data line 120G is supplied with a data voltage of the green pixel 130G.

As shown in FIG. 14, the area of green pixel 130G is increased, whereby transmittance is enhanced by the increase of aperture ratio in the green pixel 130G. Also, it is possible to adjust the color coordinates of white color without decreasing the aperture ratio in a unit pixel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A liquid crystal display apparatus comprising:
   a red pixel for transmitting red-colored light;
   a red pixel switching element that switches a driving signal of the red pixel;
   a green pixel for transmitting green-colored light;
   a green pixel switching element that switches a driving signal of the green pixel;
   a blue pixel for transmitting blue-colored light;
   a blue pixel switching element that switches a driving signal of the blue pixel;
   a contact pattern contacting a drain of low luminance pixel switching element; and
   a bridge pattern crossing a low luminance pixel area and a high luminance pixel area,
   wherein,
   a switching element of at least one pixel having relatively low luminance among the red pixel, green pixel and blue pixel is formed in the pixel area having relatively high luminance, and
   first side of the bridge pattern is connected to the contact pattern, and second side of the bridge pattern is connected to a pixel electrode of the low luminance pixel area.

2. The liquid crystal display apparatus according to claim 1, wherein the entire switching element of the blue pixel whose luminance is relatively lower than that of the green pixel is formed in the area of the green pixel.

3. The liquid crystal display apparatus according to claim 1, wherein a predetermined portion of the switching element of the blue pixel whose luminance is relatively lower than that of the green pixel is formed in the area of the green pixel.

4. The liquid crystal display apparatus according to claim 1, wherein the entire switching element of the red pixel whose luminance is relatively lower than that of the green pixel is formed in the area of the green pixel.

5. The liquid crystal display apparatus according to claim 1, wherein a predetermined portion of the switching element of the red pixel whose luminance is relatively lower than that of the green pixel is formed in the area of the green pixel.

6. The liquid crystal display apparatus according to claim 1, wherein the entire switching elements of the blue pixel and red pixel whose luminance is relatively lower than that of the green pixel are formed in the area of the green pixel.

7. The liquid crystal display apparatus according to claim 1, wherein predetermined portions of the switching elements of the red pixel and blue pixel whose luminance is relatively lower than that of the green pixel are formed in the area of the green pixel.

8. The liquid crystal display apparatus according to claim 1, wherein the entire switching element of the blue pixel and a predetermined portion of the switching element of the red pixel, luminance of which is relatively lower than that of the green pixel, are formed in the area of the green pixel.

9. The liquid crystal display apparatus according to claim 1, wherein the red pixel, green pixel, and blue pixel have the same breadth (X) and length (Y), or have the different breadths (X) and lengths (Y), respectively.

10. The liquid crystal display apparatus according to claim 1, wherein the red pixel, green pixel, and blue pixel have different breadths (X) and lengths (Y).

11. The liquid crystal display apparatus according to claim 1, wherein the color coordinates of white color are adjusted by providing the pixel area having relatively high luminance with the switching element of at least one pixel having relatively low luminance among the red pixel, green pixel and blue pixel.

12. A liquid crystal display apparatus comprising:
a plurality of gate and data lines crossing each other;
a red pixel switching element that switches driving of a red pixel;
a green pixel switching element that switches driving of a green pixel; and
a blue pixel switching element that switches driving of a blue pixel, wherein,
a data line that supplies a data voltage to the pixel with relatively low luminance among the red, green and blue pixels is bent toward the pixel with relatively high luminance, and
an area of the pixel with relatively low luminance is larger in size than an area of the pixel with relatively high luminance, and the area size of the pixel with relatively low luminance increases by an area corresponding to the red, green, or blue pixel switching element.

13. The liquid crystal display apparatus according to claim 12, wherein a data line that supplies a data voltage to the blue pixel among the red, green and blue pixels is bent toward the green pixel.

14. The liquid crystal display apparatus according to claim 12, wherein a data line that supplies a data voltage to the red pixel among the red, green and blue pixels is bent toward the green pixel.

15. The liquid crystal display apparatus according to claim 12, wherein a data line that supplies a data voltage to the green pixel among the red, green and blue pixels is bent toward the red pixel or blue pixel.

16. The liquid crystal display apparatus according to claim 13, wherein an area of the pixel with low luminance is larger in size than an area of the pixel with high luminance, and a switching element is formed in a space prepared by the bent data line.

17. The liquid crystal display apparatus according to claim 13, wherein an area of the red pixel or blue pixel is larger than an area of the green pixel.

18. The liquid crystal display apparatus according to claim 13, wherein an area of the red pixel and blue pixel is larger than an area of the green pixel.

19. The liquid crystal display apparatus according to claim 13, wherein an area of the green pixel is larger than an area of the red pixel or blue pixel.

* * * * *